United States Patent [19]
Petzl et al.

[11] Patent Number: 5,608,953
[45] Date of Patent: Mar. 11, 1997

[54] SNAP-HOOK WITH LOCKING RING

[75] Inventors: Paul Petzl, Barraux; Alain Maurice, Gieres, both of France

[73] Assignee: Zedel, Crolles, France

[21] Appl. No.: 597,205

[22] Filed: Feb. 6, 1996

[30] Foreign Application Priority Data

Mar. 2, 1995 [FR] France ................................. 95 02658

[51] Int. Cl.$^6$ ................................................. A63B 29/00
[52] U.S. Cl. ........................ 24/573.5; 24/573.1; 24/599.9
[58] Field of Search ............................... 24/573.5, 573.1, 24/599.1, 599.9

[56] References Cited

U.S. PATENT DOCUMENTS

| | | | |
|---|---|---|---|
| 831,260 | 9/1906 | Borlaug | 24/573.5 |
| 4,930,194 | 6/1990 | Frechin | 24/573.5 |
| 5,287,645 | 2/1994 | Gois | 24/573.5 |

FOREIGN PATENT DOCUMENTS

| | | | |
|---|---|---|---|
| 2146703 | 3/1973 | France . | |
| 2461146 | 1/1981 | France | 24/573.5 |
| 9110358 | 11/1991 | Germany . | |
| 604755 | 9/1978 | Switzerland . | |
| 2077838 | 12/1981 | United Kingdom . | |
| 93/25822 | 12/1993 | WIPO . | |

Primary Examiner—Victor N. Sakran
Attorney, Agent, or Firm—Oliff & Berridge

[57] ABSTRACT

A snap-hook comprises a pivoting finger, associated to a locking ring movable in rotation between a first locking position and a second unlocking position. A locking bolt cooperates with the ring to lock the latter positively in the first position.

10 Claims, 6 Drawing Sheets

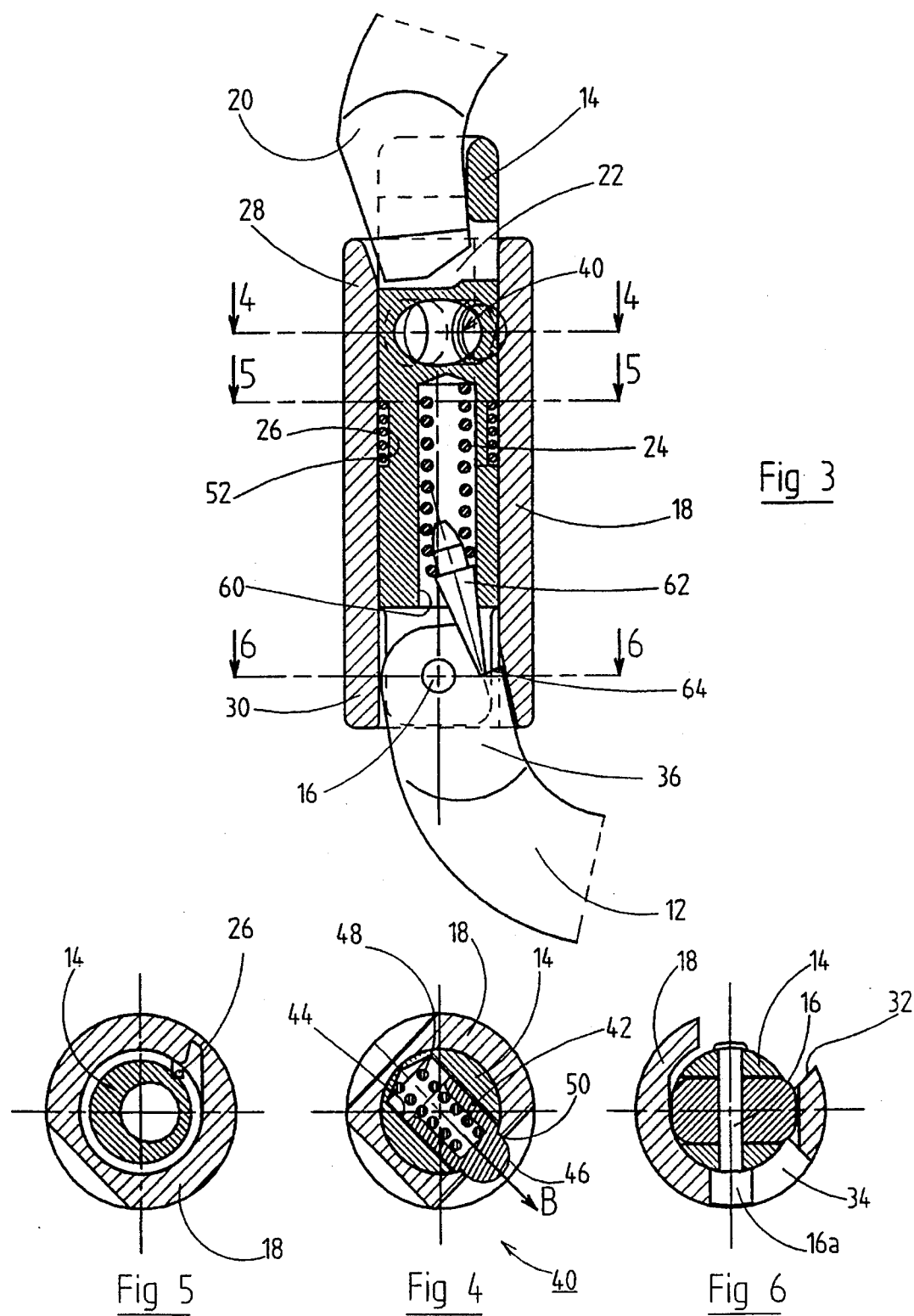

SNAP-HOOK WITH LOCKING RING

BACKGROUND OF THE INVENTION

The invention relates to a snap-hook, notably for mountain climbing, comprising a C-shaped metallic body, having a first end provided with a male securing part, and a second end for articulation of a mobile finger around a pivoting spindle between a closed position and an open position, said finger comprising:

a female securing part arranged opposite the pivoting spindle to cooperate with the male securing part in the closed position, a first return spring to return the finger to the closed position, a locking ring mounted with limited rotation coaxially around the finger between a first locking position and a second unlocking position, said ring comprising memory means to keep it in the second unlocking position so long as the finger is open, and a second return spring to return the locking ring to the first locking position when the finger is closed.

Known snap-hooks make use of a rotary locking ring, kept in the locking position by the elastic force of the return spring. To open the snap-hook by pivoting of the finger towards the inside of the body, the ring first has to be turned to the unlocking position. The angular travel of the ring between the two locking and unlocking positions is relatively large, notably about 90°, which makes handling with the thumb and forefinger of one hand complicated. Another drawback concerns the safety which is not total, for a large friction of the rope may result in untimely unlocking of the ring, and cause undesired opening of the finger.

To improve the safety, another known snap-hook proposes reinforcing the unlocking movement of the ring, by combining a first translation movement with a second rotational movement to the unlocking position. The ring however still remains subjected to elastic forces, which does not exclude untimely opening of the finger in the presence of a very large friction of the rope. Handling such a snap-hook with one hand is moreover difficult.

A third type of snap-hook exists with a manual locking ring with bayonet, which is bistable, that is to say that it does not automatically return to the locking position when the finger is reclosed. Safety is not assured if the user forgets to lock the ring manually.

SUMMARY OF THE INVENTION

The object of the invention consists in making the handling of a snap-hook with an automatic locking ring easier, while increasing the user's safety.

The snap-hook according to the invention is characterized in that the finger comprises in addition a locking bolt cooperating in the active position with the ring to lock the latter positively in the first locking position, and operating means to actuate the locking bolt to an inactive position allowing rotation of the ring to the second unlocking position.

The friction effect of the rope on the rotary ring is ineffective, given that the locking bolt performs positive locking of the ring in the locking position. Safety is total, for the finger remains closed as long as the locking bolt is not actuated manually to the inactive position. The presence of the locking bolt enables the angular travel of the ring for release of the finger to be decreased, which makes handling with two fingers easy.

According to a preferred embodiment, the locking bolt is equipped with a telescopic pin fitted in an orifice of the finger and associated to a third return spring to return the pin to the active position. The pin comprises an appreciably rounded stopping surface, notably in the shape of a ball, cooperating with the internal cylindrical wall of the locking ring to keep the locking bolt in the inactive position during the operating of the ring, and to constitute the positive locking in the active position of the locking bolt when the stopping surface engages in the first locking position inside a radial hole of the ring.

According to another embodiment, the locking bolt comprises a latching lever pivotally mounted on a spindle of the finger, said lever having a radial extension protruding out from an opening of the locking ring to actuate the locking bolt between the active and inactive positions.

According to a feature of the invention, the locking ring comprises an opening shaped as a curved button-hole for housing a boss, said button-hole being arranged to determine the angular travel of the ring between the first locking position, and the second unlocking position, and to position the ring axially with respect to the finger.

The locking ring is advantageously provided with a pair of gripping surfaces in the form of diametrically opposite dishes, to facilitate unlocking of the locking bolt and rotation of the ring to the second unlocking position, said hole being located in the middle part of one of the dishes.

BRIEF DESCRIPTION OF THE DRAWINGS

Other advantages and features will become more clearly apparent from the following description, given as an example only and represented in the accompanying drawings, in which:

FIG. 3 represents an axial sectional view of the finger of FIG. 1;

FIGS. 4 to 6 are cross-sectional views respectively along the lines 4—4, 5—5 and 6—6 of FIG. 3;

DETAILED DESCRIPTION OF THE PREFERRED EMBODIMENT

Figure 7:
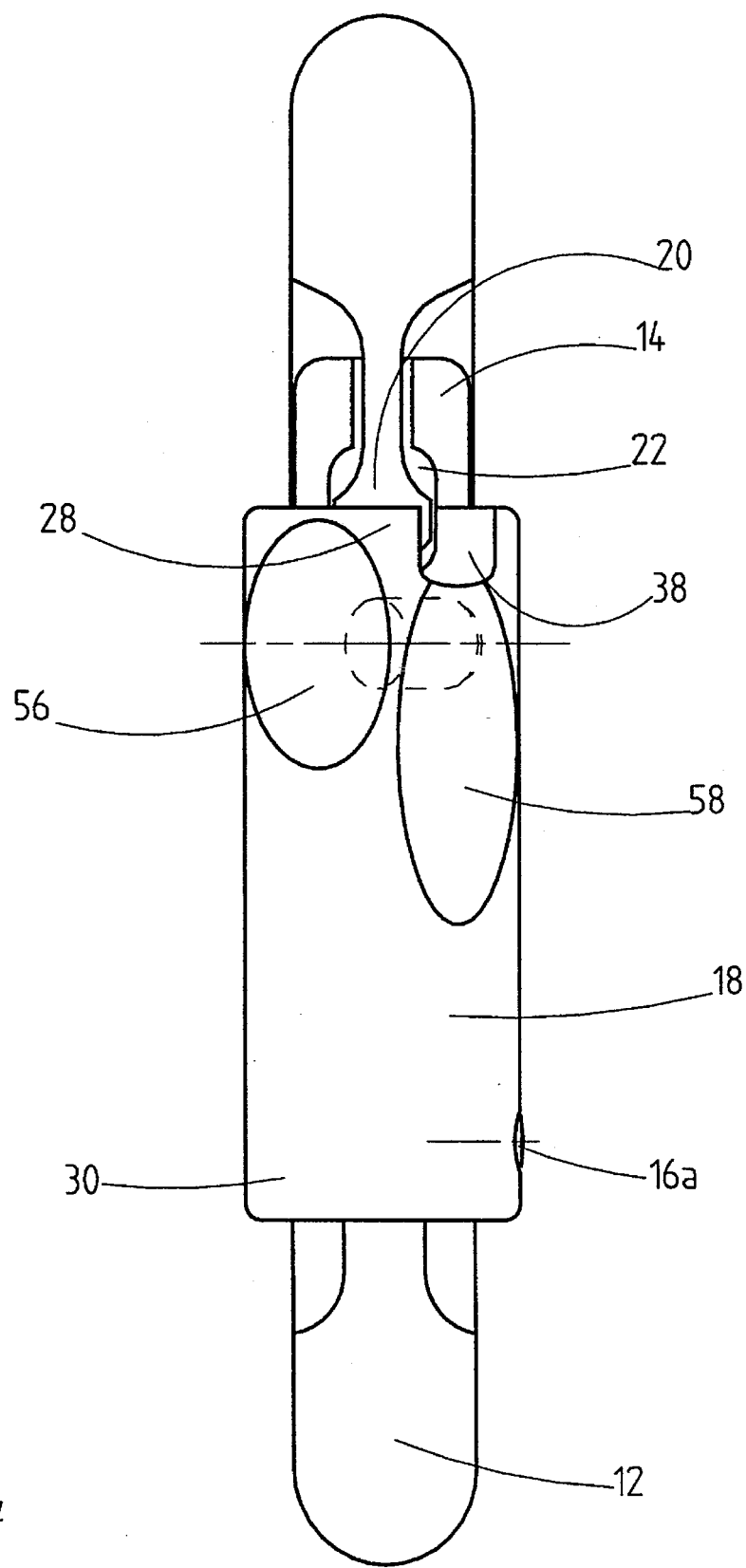
FIGS. 7 and 8 show side views of FIG. 1, respectively in the locking position and in the unlocking position of the locking ring.
Figure 8:
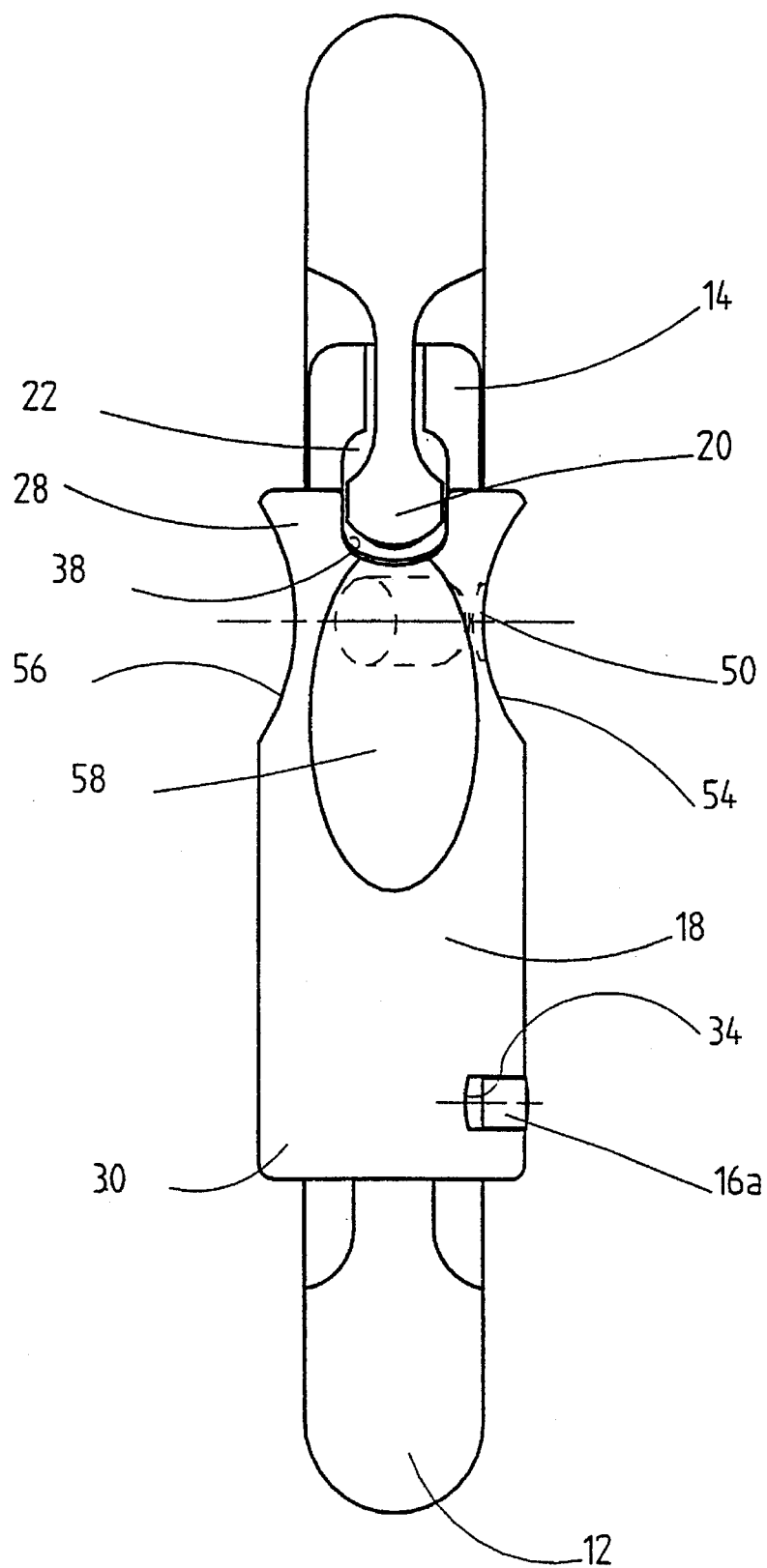

In FIGS. 1 to 8, a snap-hook 10 for mountain climbing comprises a C-shaped metallic body 12 and a mobile finger 14 pivotally mounted on a spindle 16 located at the bottom end of the body 12. The metallic finger 14 has a cylindrical cross-section, and is equipped with a coaxial locking ring 18, mounted with a slight radial clearance in limited rotation around the finger 14 between a first locking position (FIG. 7) and a second unlocking position (FIG. 8).

In the unlocking position of the ring 18, the finger 14 is movable towards the inside of the body 12, allowing opening of the snap-hook (FIG. 2) to enable either a rope or a strap to be inserted, or to enable the snap-hook to be secured to a securing device (not represented).

The top end of the body 12 is provided with a male part 20 designed to engage in a female part 22 of the finger 14 when returning to the closed position (FIG. 1) due to the action of a first return spring 24. The male part 20 presents a reverse T-shaped structure comprising a tab extended by a protuberance in the form of a cap. The female part 22 of the finger 14 is situated opposite the pivoting spindle 16, and comprises a recess of conjugate shape to the male part 20. The length of the locking ring 18 is smaller than that of the finger 14, and the ends of the ring 18 are located respectively at the level of the male part 20, and protruding out from the pivoting spindle 16.

In the closed position of the finger 14, a second return spring 26 urges the locking ring 18 to the first locking position (FIG. 7). The upper part of the ring 18 is facing the protuberance of the male part 20, which prevents any pivoting of the finger 14 towards the inside when a thrust action takes place exerted perpendicularly with respect to the longitudinal direction of the ring 18 (see arrow A, FIG. 1).

In FIG. 6, the annular lower part 30 of the locking ring 18 is provided with a groove 32 having the form of a U-shaped semi-open notch, and with an opening 34 arranged as a curved button-hole for housing a boss 16a situated in the extension of the spindle 16. The groove 32 and opening 34 are offset angularly with respect to the longitudinal direction of the finger 14. The length of the curved opening 34 determines the angular travel of the locking ring 18 with precision when its limited rotation takes place between the first locking position and the second unlocking position. The angular travel of the ring 18 corresponds to about 45°.

The presence of the extension 16a of the spindle 16 in the opening 34 provides in addition to its angular stop function, a second function of axial positioning of the ring 18 with respect to the longitudinal direction of the finger 14. The semi-rounded opposite ends of the button-hole 34 constitute means for stopping in rotation, whereas the parallel edges cooperate with the extension 16a to form the means for stopping in translation.

The function of the groove 32 acts as a memory means to keep the locking ring 18 in the second unlocking position as long as the finger 14 is open. One of the edges of the groove 32 remains permanently in contact with a bearing face 36 of the bottom end of the body 12 and prevents any return movement of the ring 18 to the first locking position.

The top edge of the locking ring 18 comprises a slot 38 allowing the protuberance of the male part 20 to pass when the ring 18 is in the second unlocking position (FIG. 8). Opening of the finger 14 is then possible by a pushing action making the finger 14 and ring 18 pivot around the spindle 16.

The mobile finger 14 is in addition equipped with a locking bolt 40 designed to positively lock the ring 18 in the first locking position. According to the embodiment of FIG. 4, the locking bolt 40 comprises a telescopic pin 42 mounted in a radial orifice 44 of the finger 14, and provided with a rounded stopping surface 46, notably in the shape of a ball. The pin 42 is associated to a third return spring 48 housed in the orifice 44, and urging the stopping surface 46 outwards in the direction of the arrow B. The third spring 48 is advantageously formed by a compression spring.

The locking ring 18 is provided with a circular hole 50 allowing protrusion of the stopping surface 46 of the pin 42 in the first locking position. In this positive locking position illustrated in FIG. 4, any rotation movement of the ring 18 towards the second unlocking position is rendered impossible, and the finger 14 remains closed with total safety, independently of any effort exerted on the finger 14.

The second return spring 26 returning the ring 18 to the locking position is formed by a torsion spring arranged in an annular groove 52 located in the middle part of the finger 14. One of the strands of the second spring 16 is engaged in an indentation arranged in the internal wall of the cylindrical ring 18, enabling precompression of the spring 26 before the ring 18 is inserted on the finger 14. The presence of the spring 26 in the groove 52 enables the radial clearance between the finger 14 and rotary ring 18 to be kept to a minimum value.

Actuation of the locking ring 18 to move it from the first locking position to the second unlocking position is made easier due to a pair of gripping surfaces 54, 56 shaped as diametrically opposite dishes, at the level of the upper part of the ring 18. The hole 50 for passage of the pin 42 is situated at the bottom of the gripping surface 54, which facilitates the unlocking action of the locking bolt 40.

Figure 1:
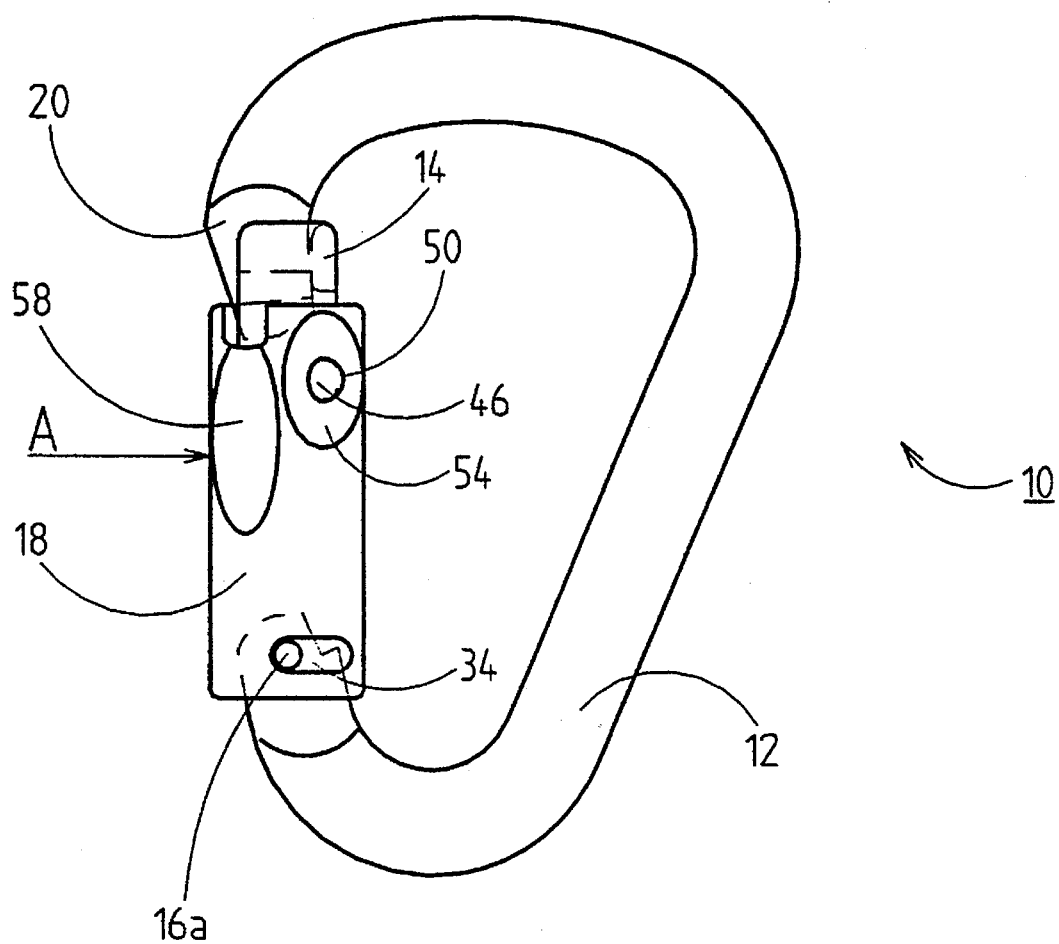
FIG. 1 is an elevational view of the snap-hook according to the invention, the finger being closed and locked by the ring.
Figure 2:
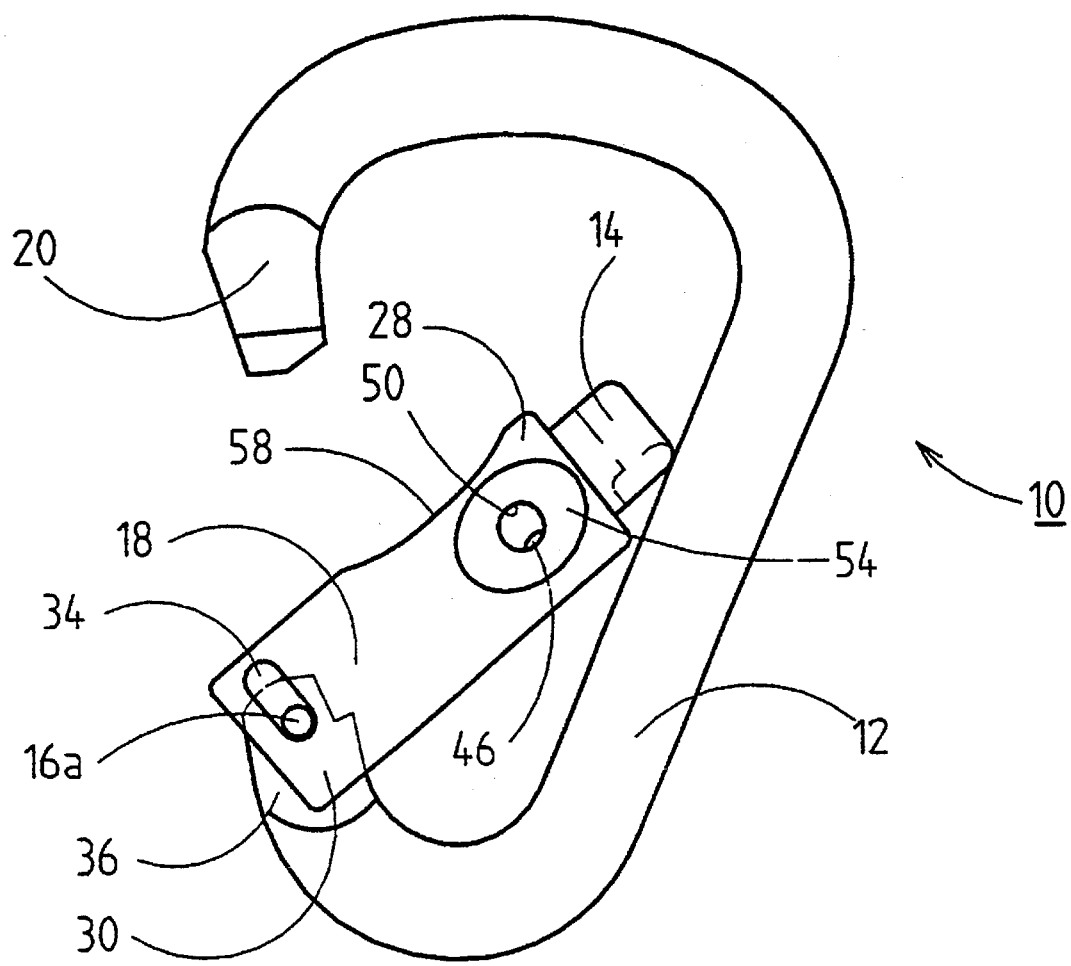
FIG. 2 shows an identical view to FIG. 1, with the finger in the open unlocked position.

Between the two gripping surfaces 54, 56 of the ring 18 there is located a slightly concave recess 58 to enlarge the inlet orifice of the snap-hook when the finger 14 is open (FIG. 2). The first spiral spring 24 extends in a blind and eccentric bore 60 of the finger 14. The base of the spring 24 is associated to a tail 62 bearing on an edge 64 of the face 36 of the body 12, the edge 64 being situated between the spindle 16 and the bottom part 30 of the ring 18. The flexion of the spring 24 when the finger 14 is opened tends to bring it automatically back to the closed position as soon as the user releases it.

The operation of the snap-hook 10 with locking ring 18 can be summed up as follows:

In the closed position (FIGS. 1 and 7), the locking bolt 40 is in the active position, and keeps the locking ring 18 in the first locking position. The top part 28 of the ring 18 constitutes a stopping means which prevents any pivoting movement of the finger 14 towards the inside of the body 12. The third spring 48 keeps the stopping surface 46 of the locking bolt 40 in the hole 50 of the ring 18 to immobilise it in rotation.

Opening of the mobile finger 14 requires prior unlocking of the locking bolt 40 by a pushing action of the forefinger on the ball of the pin 42 against the force of the third spring 48. Using the thumb and forefinger, the ring 18 then simply has to be turned clockwise to move it to the second unlocking position (FIG. 8), then allowing pivoting of the finger 14 towards the inside (FIG. 2). The ring 18 keeps the locking bolt 40 in the active position right from the beginning of the angular travel. The memory effect resulting from the cooperation of the groove 32 with the bearing face 36 when the finger 14 is opened prevents any return of the rotary ring 18 to the first locking position. The ring 18 remains unlocked until the finger 14 is reclosed due to the return action of the first spring 24.

At the end of closing travel of the finger 14, the memory effect disappears and the second spring 26 brings the locking ring 18 back to the first locking position, in which the locking bolt 40 becomes active again as soon as the stopping surface 46 of the telescopic pin protrudes out from the hole 50 due to the action of the third spring 48.

The presence of the locking bolt 40 enables the angular travel of the rotary ring 18 to release the finger 14 to be reduced. The unlocking and rotation operations of the ring 18, and also pivoting of the mobile finger 14 for opening of the snap-hook are performed very easily with the thumb and forefinger of one hand.

Preassembly of the assembly formed by the finger 14, locking ring 18, locking bolt 40, tail 62, and springs 24, 26, 48 is performed before the pivoting spindle 16 is finally fitted.

Figure 9:
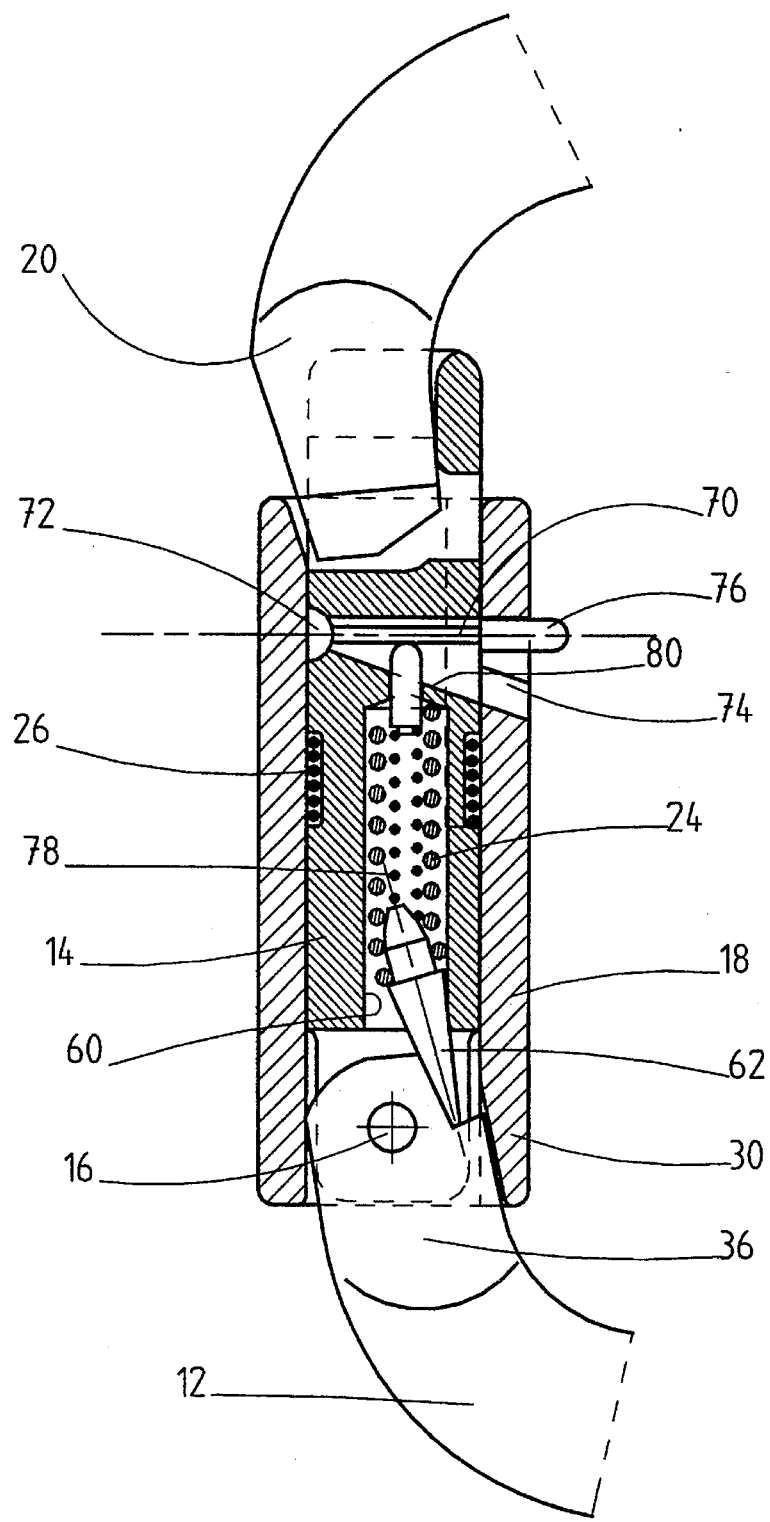
FIG. 9 is an identical view to FIG. 3 of an alternative embodiment.

With reference to the alternative embodiment of FIG. 9, the same reference numbers will be used to designate identical parts to those of FIGS. 1–8. The locking bolt comprises a latching lever pivotally mounted on a spindle 72 of the finger 14. The locking ring 18 is provided with an opening 74 through which a radial extension 76 of the lever 70 protrudes. A polarization spring 78 is arranged coaxially inside the first spring 24, and acts perpendicularly on the intermediate part of the latching lever 70 urging the latter to the active position. The passage from the active position (FIG. 9) to the inactive position (not represented) is achieved by a downward movement of the extension 76, making the lever 70 come up against an inclined ramp 80.

In the lowered position of the lever 70, it is possible to turn the ring 18 to the second unlocking position, allowing pivoting of the finger 14 around its spindle 16.

It is clear that the locking bolt 40 can be achieved differently without departing from the scope of the invention.

The locking ring 18 can be made of metallic or plastic material.

What is claimed is:

1. A snap-hook, notably for mountain climbing, comprising a C-shaped metallic body, having a first end provided with a male securing part, and a second end for articulation of a mobile finger around a pivoting spindle between a closed position and an open position, said finger comprising:

a female securing part arranged opposite the pivoting spindle to cooperate with the male securing part in the closed position, a first return spring to return the finger to the closed position, a locking ring mounted with limited rotation coaxially around the finger between a first locking position and a second unlocking position, said ring comprising memory means to keep it in the second unlocking position so long as the finger is open, a second return spring to return the locking ring to the first locking position when the finger is closed, a locking bolt arranged on said finger for cooperating in the active position with the ring to lock the latter positively in the first locking position, and operating means to actuate the locking bolt to an inactive position allowing rotation of the ring to the second unlocking position.

2. The snap-hook according to claim 1, wherein the locking bolt is equipped with a telescopic pin fitted in an orifice of the finger, and associated to a third return spring to return the pin to the active position.

3. The snap-hook according to claim 2, wherein the pin comprises an appreciably rounded stopping surface, notably in the shape of a ball, cooperating with the internal cylindrical wall of the locking ring to keep the locking bolt in the inactive position during the rotational movement of the ring, and to constitute the positive locking in the active position of the locking bolt when the stopping surface engages in the first locking position inside a radial hole of the ring.

4. The snap-hook according to claim 3, wherein the locking ring is provided with a pair of gripping surfaces in the form of diametrically opposite dishes, to facilitate unlocking of the locking bolt and rotation of the ring to the second unlocking position, said hole being located in the middle part of one of the dishes.

5. The snap-hook according to claim 1, wherein the locking bolt comprises a latching lever pivotally mounted on a spindle of the finger, said lever having a radial extension protruding out from an opening of the locking ring to actuate the locking bolt between the active and inactive positions.

6. The snap-hook according to claim 4, wherein the latching lever is associated to a polarization spring arranged coaxially inside the first spring, the line of action of said polarization spring being appreciably perpendicular to the intermediate part of the lever urging the latter to the active position.

7. The snap-hook according to claim 1, wherein the locking ring comprises an opening shaped as a curved button-hole for housing a boss, said button-hole being arranged to determine the angular travel of the ring between the first locking position and the second unlocking position, and to position the ring axially with respect to the finger.

8. The snap-hook according to claim 1, wherein the second return spring of the ring is formed by a torsion spring arranged in an annular groove of the finger, one of the strands of said spring being engaged in an indentation arranged in the internal wall of the cylindrical ring to enable precompression before the ring is inserted on the finger.

9. The snap-hook according to claim 1, wherein the locking ring is made of metallic or plastic material.

10. The snap-hook according to claim 8, wherein the locking ring is equipped with a slightly concave recess arranged between the two gripping surfaces to enlarge the inlet orifice of the snap-hook when the finger is open.

\* \* \* \* \*